Patented Sept. 13, 1932

1,876,837

UNITED STATES PATENT OFFICE

ANTON BETTSCHART, OF NEUHAUSEN, SWITZERLAND, AND OTTO NYDEGGER, OF BERGHEIM-ERFT, GERMANY

PROCESS FOR REDUCING THE ATTACKS BY ALKALINE LIQUIDS ON STRAINING CLOTHS

No Drawing. Application filed January 10, 1930, Serial No. 420,004, and in Germany January 17, 1929.

This invention relates to a process for reducing or counter-acting the attacks of alkaline liquids on straining cloths.

It is known that straining cloths such as those made from cotton fibres do not stand up to a lengthy action by alkaline liquids, but lose their original strength in a relatively short time, even with weak lyes, and more particularly when in contact with air. Consequently a relatively frequent change of the straining cloths becomes necessary, which is uneconomical, and, also both disturbing and inconvenient, when the cloths are used in continuous operation processes.

According to the invention the resistance to destruction of such straining cloths used for filtering alkaline liquids is very considerably increased when the filtration is carried out in the presence of manganese-oxygen compounds. These compounds exercise a protective action on the straining cloths and consequently lengthen their life in a great measure.

Still according to the invention, several methods are available to provide for the presence of the mentioned manganese compounds during filtration.

In one method, a precipitate of manganese-oxygen-compounds is produced on the straining cloths, either by direct precipitation of manganese-hydroxides (or manganese oxides, preferably manganese dioxide) in a finely divided state, or by saturating the fibres with solutions of manganese salts and converting the latter, on the fibre, into oxygen compounds. Alkali-permanganate solutions have been found to be particularly suitable for this purpose.

The production of the manganese-oxide-precipitates on the fibres is effected before or after their working on the straining cloths. It is essential that the prepared straining cloths be provided during the filtration with such a precipitate of manganese oxides.

Another method of carrying out the present invention consists in producing the protective manganese-oxygen compounds during the filtration of the alkaline liquids, by the addition of suitable manganese-containing materials either to the raw material itself or during any step of a further treatment, such as a disintegrating process.

It has, for example, been found, that in the treatment of alumina-containing raw materials such as bauxite and the like, the disintegrating of straining cloths by alkalies is considerably reduced, if manganese oxides, for example manganese dioxide, or other manganese compounds, such as potassium permanganate, are added to the raw material before, during or after the disintegrating process. This particular process, as applied to the treatment of bauxite for producing alumina, consists, for instance, in drying, pulverizing and then treating the bauxite material with sodium carbonate or sodium hydroxide.

The same result as with pure manganese compounds is obtained by the addition of materials which contain these compounds. In the treatment of bauxite, the desired effect is produced by adding to a manganese-deficient bauxite suitable quantities of a bauxite rich in manganese. When a bauxite, poor in manganese, is mixed with such quantities of bauxite rich in manganese that the mixture contains .5% MnO, the resistance of the straining cloths against the alumina-lyes is almost doubled.

A further considerable increase in the life of the cloths is produced by the combination of the direct production of manganese oxide on the cloth with the addition of manganese compounds either to the raw materials or to the lyes to be filtered.

Having thus described our invention, we claim:—

1. A process for reducing the attacks of alkaline liquids on straining cloths, which comprises filtering said liquids in the presence of manganese-oxygen compounds.

2. A process as claimed in claim 1 which comprises precipitating manganese-oxygen-compounds on the straining cloths.

3. A process as claimed in claim 1 which comprises saturating the fibres of the straining cloths with solutions of manganese salts, and converting said salts into manganese-oxygen-compounds.

4. A process as claimed in claim 1 which comprises adding materials containing manganese to the raw material to be filtered.

In witness whereof we have hereunto set our hands.

A. BETTSCHART.
OTTO NYDEGGER.